United States Patent
Mukherjee

(10) Patent No.: US 11,822,875 B2
(45) Date of Patent: Nov. 21, 2023

(54) AUTOMATICALLY EVALUATING SUMMARIZERS

(71) Applicant: ServiceNow, Inc., Santa Clara, CA (US)

(72) Inventor: Partha Sarathi Mukherjee, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/503,878

(22) Filed: Oct. 18, 2021

(65) Prior Publication Data

US 2023/0122609 A1    Apr. 20, 2023

(51) Int. Cl.
*G06F 40/166*    (2020.01)

(52) U.S. Cl.
CPC .................. *G06F 40/166* (2020.01)

(58) Field of Classification Search
CPC .................................................. G06F 40/166
See application file for complete search history.

(56) References Cited

U.S. PATENT DOCUMENTS

| | | | |
|---|---|---|---|
| 2018/0018392 A1* | 1/2018 | Simske | G06F 17/30719 |
| 2019/0327103 A1* | 10/2019 | Niekrasz | H04L 12/1831 |
| 2021/0365773 A1* | 11/2021 | Subramanian et al. | G06N 3/08 |
| 2022/0067269 A1* | 3/2022 | de Oliveira et al. | G06F 40/166 |

OTHER PUBLICATIONS

Allahyari et al., "Text Summarization Techniques: A Brief Survey", Jul. 7, 2017.
Chen et al., "Meta-Transfer Learning for Low-Resource Abstractive Summarization", May 31, 2021.
Liu et al., "Generating Wikipedia by Summarizing Long Sequences", ICLR 2018, Jan. 30, 2018.
Narayan et al., "Stepwise Extractive Summarization and Planning with Structured Transformers", Oct. 6, 2020.
Park et al., "Learning to Summarize Long Texts with Memory Compression and Transfer", Oct. 21, 2020.
Subramanian et al., "On Extractive and Abstractive Neural Document Summarization with Transformer Language Models", Apr. 28, 2021.
Zhang et al., "PEGASUS: Pre-training with Extracted Gap-sentences for Abstractive Summarization", Jul. 10, 2020.

* cited by examiner

*Primary Examiner* — James J Debrow
(74) *Attorney, Agent, or Firm* — Van Pelt, Yi & James LLP

(57) ABSTRACT

Content to be summarized is received and analyzed using an extractive summarizer to determine a reference extractive summary of the content. The content is further analyzed using a plurality of different abstractive summarizers to determine candidate abstractive summaries of the content. Each of the candidate abstractive summaries is compared with the reference extractive summary to determine corresponding evaluation metrics. Based at least in part on the evaluation metrics, one of the candidate abstractive summaries is selected as a selected summary to be provided.

20 Claims, 5 Drawing Sheets

AUTOMATICALLY EVALUATING SUMMARIZERS

BACKGROUND OF THE INVENTION

Text summarization condenses a longer document down to the document's key points. By highlighting the most critical points of the original document, a user can be presented with the generated summary as an alternative or in addition to the original document. Text summarization techniques can be applied to a variety of documents types such as knowledge-based articles, news articles, research papers, marketing material, financial documents, and email.

BRIEF DESCRIPTION OF THE DRAWINGS

Various embodiments of the invention are disclosed in the following detailed description and the accompanying drawings.

DETAILED DESCRIPTION

Figure 1:
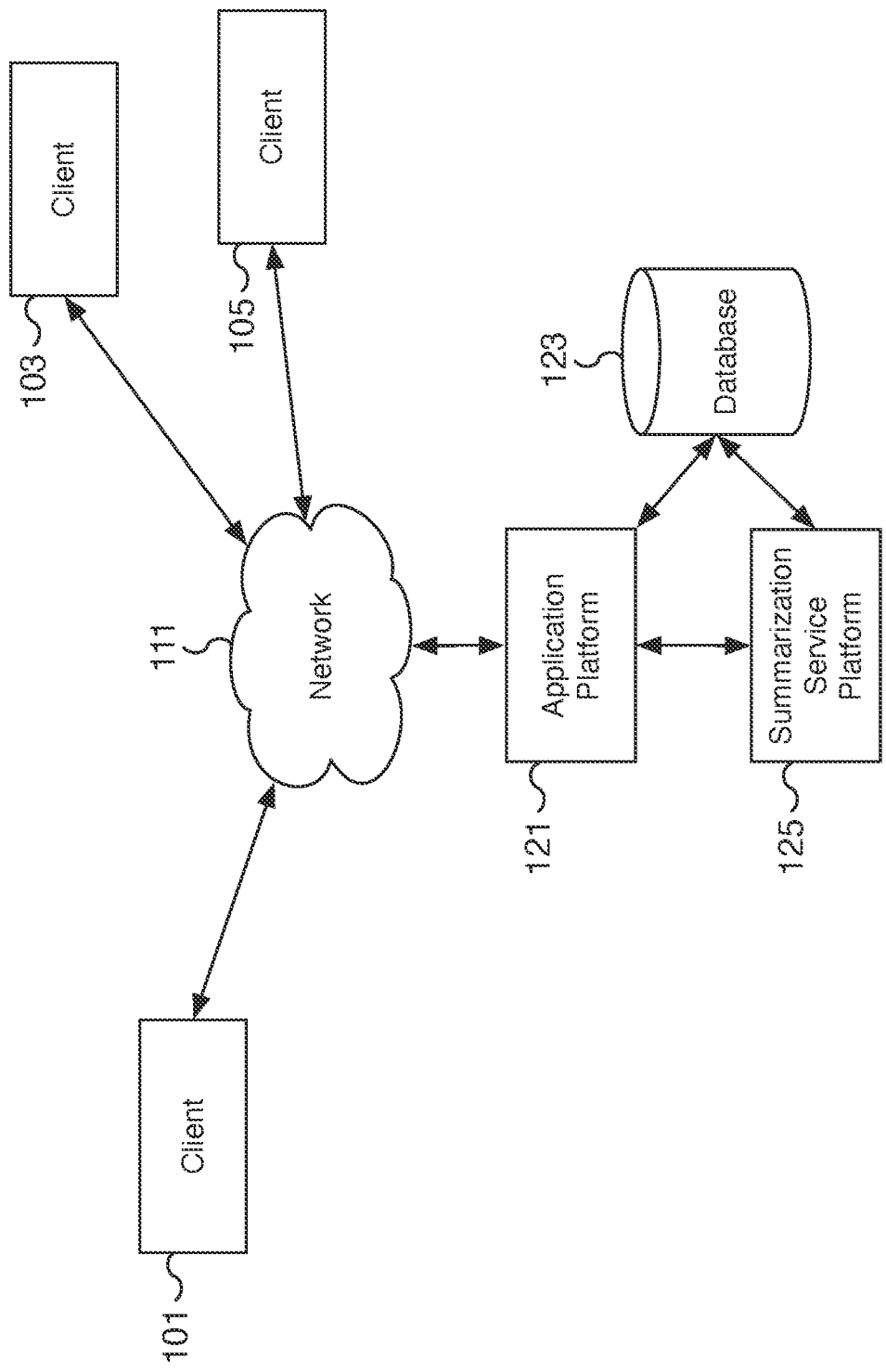
FIG. 1 is a block diagram illustrating an example of a network environment for automating evaluating and utilizing text summarizers.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The automatic evaluation of text summarizers is disclosed. Using the disclosed techniques, a summarizer such as an abstractive summarizer can be automatically evaluated and selected from a group of different abstractive summarizers. The selected summarizer can be automatically identified as the best performing summarizer for a particular document type, generating summaries that outperform those generated by the alternative summarizers. This evaluation and identification of different abstractive summarizers can be performed automatically without human intervention and allows for highly accurate and automated mass text summarization of documents with minimal delay once a summary for a document is requested.

In various embodiments, a group of text summarizers is automatically evaluated by comparing the performance of the candidate summarizers to a base summarizer. For example, a base summarizer, such as an extractive summarizer, is first selected. The base summarizer is used to generate a base summary for a document. In parallel, a selection of different candidate abstractive summarizers is used to generate a selection of abstractive summaries for the same document. Since each abstractive summarizer is different, the generated abstractive summaries can differ significantly. For example, each abstractive summarizer can be uniquely trained using a different corpus of documents including different document types. In various embodiments, for each generated abstractive summary, the summary is compared to the base extractive summary generated by the base extractive summarizer. The abstractive summary closest to the base summary corresponds to the best abstractive summarizer. In some embodiments, a Rouge-L f-measure metric is computed for each of the abstractive summaries, one by one, against the base summary. The computed Rouge-L f-measure values for the different generated abstractive summaries correspond to how near each abstractive summary is compared to the base summary. The summary with the highest f-measure value can be chosen as the best summary and its corresponding summarizer is the best abstractive summarizer. In some embodiments, the process is performed not only on a single document but across a corpus of documents to select the best summarizer. In various embodiments, the abstractive summary that is most similar to the base summary is identified and its corresponding abstractive summarizer is selected as the model summarizer. In some embodiments, the abstractive summarizers are ranked, and the model summarizer is selected from the top-ranking abstractive summarizers. Once a model summarizer is selected, it can be utilized for future summarization tasks.

In some embodiments, content to be summarized is received. For example, a document such as a knowledge-based article, news article, research paper, marketing article, financial document, email, or a document of another type, is identified for summarization and is received by a text summarization platform. The content is analyzed using an extractive summarizer to determine a reference extractive summary of the content. For example, an extractive summarize is selected as a base summarizer and used to generate a base summary that is used as a reference summary. An extractive summarizer can be utilized since the contents of the generated summary will accurately reflect the original document. In some embodiments, the content is analyzed using a plurality of different abstractive summarizers to determine candidate abstractive summaries of the content. For example, abstractive summarizers from a group of candidate abstractive summarizers are each used to generate a corresponding different abstractive summary. The generated abstractive summaries can vary significantly depending on the candidate abstractive summarizer used to generate the corresponding summary. Each of the candidate abstractive summaries is compared with the reference extractive summary to determine corresponding evaluation metrics. For example, each candidate abstractive summary is compared with the base summary to identify how different (and/or similar) each candidate abstractive summary is from the base summary. The difference can be computed using corresponding evaluation metrics. In some embodiments, the evaluation metrics utilized are Rouge-L f-measure metric values. Based at least in part on the evaluation metrics, one of the candidate abstractive summaries is selected as a selected summary to be provided. For example, the summary closest to the base summary can be selected as the best abstractive summary. In some embodiments, the abstractive summarizer corresponding to the best abstractive summary is selected as the best abstractive summarizer for performing future text summarization requests.

FIG. 1 is a block diagram illustrating an example of a network environment for automating evaluating and utilizing text summarizers. In the example shown, clients 101, 103, and 105 access cloud-based application platform 121 via network 111. Network 111 can be a public or private network. In some embodiments, network 111 is a public network such as the Internet. Application platform 121 hosts cloud services such as a text summarization service for creating abstractive text summaries of provided or referenced content. For example, a document is provided via one of clients 101, 103, and 105 to application platform 121 and a summary of the document is created. The created summary can be hosted by application platform 121 and subsequently accessed by clients such as clients 101, 103, and 105. Examples of content that can be summarized include but are not limited to knowledge-based articles, news articles, research papers, marketing material, financial documents, and email. In various embodiments, the text summarization cloud services offered by application platform 121 are enabled by summarization service platform 125. For example, a text summarization service hosted by application platform 121 can be automated using summarization service platform 125. In various embodiments, summarization service platform 125 can evaluate the best text summarizer for a provided document from among multiple candidate text summarizers. The best summarizer can be selected and applied to create a summary, such as an abstractive text summary, of the provided document. In the example shown, application platform 121 and summarization service platform 125 are both communicatively connected to and utilize database 123. For example, database 123 can store data for cloud services hosted by application platform 121 as well as configuration and content data for summarization service platform 125.

In some embodiments, application platform 121 offers a text summarization service for provided content. The provided content can be provided by clients and/or hosted by application platform 121. For example, content such as knowledge-based articles and email can be stored in database 123 along with corresponding generated summaries of the content. Application platform 121 can utilize the text summarization services of summarization service platform 125 for generating the stored summaries, which can include generated and stored abstractive summaries. In various embodiments, generated summaries can be utilized in additional cloud services offered by application platform 121 such as search services by providing abstractive summaries of content accessed by clients.

In some embodiments, summarization service platform 125 is a summarization platform that evaluates candidate text summarizers and selects the best text summarizer for a document or type of document. For example, summarization service platform 125 can evaluate multiple abstractive summarizers and select the summarizer that generates the best abstractive summary. In various embodiments, summarization service platform 125 utilizes a base summarizer and compares the output summaries of each candidate summarizer to identify and select the model summarizer. For example, an extractive summarizer is selected as a base summarizer and its output base summary is evaluated against the abstractive summaries generated by the candidate abstractive summarizers. In some embodiments, the evaluation is performed by computing an evaluation metric such as a Rouge-L f-measure metric for each of the candidate abstractive summaries, one by one, against the base summary. The computed Rouge-L f-measure values for the different generated abstractive summaries correspond to how near each abstractive summary is compared to the base summary. The summary with the highest f-measure value can be chosen as the best summary and its corresponding summarizer can be selected as the best abstractive summarizer. In some embodiments, the process is performed not only on a single document but across a corpus of documents to select the best summarizer. In some embodiments, a different best summarizer can be identified for each type of document. For example, a different summarizer can be selected for knowledge-based articles, news articles, research papers, marketing material, financial documents, and email.

Although depicted in FIG. 1 as a single element, summarization service platform 125 may include multiple components including one or more servers such as one or more different text summarization servers, each potentially running one or more different text summarizers. Summarization service platform 125 can also include additional components such as a summary service and evaluation engine for responding to text summary requests. For example, a summary service and evaluation engine of summarization service platform 125 can select the best summarizer for a particular document or document type before generating an abstractive summary. Data used for and by summarization service platform 125 can be retrieved from a data store such as database 123. In some embodiments, the summaries and/or evaluation metrics generated by summarization service platform 125 are stored on a data store such as database 123.

In some embodiments, database 123 is a data store for supporting application platform 121 and summarization service platform 125. For example, database 123 can store configuration data used by application platform 121 and/or summarization service platform 125 for hosting cloud services and/or text summarization services, respectively. In some embodiments, database 123 is a configuration management database (CMDB) used at least in part for managing assets that are under the management of an organization. In various embodiments, database 123 is used by summarization service platform 125 for storing model data used to configure and apply different candidate abstractive summarizers as well as a base summarizer.

Although single instances of some components have been shown to simplify the diagram of FIG. 1, additional instances of any of the components shown in FIG. 1 may also exist. For example, as previously discussed, application platform 121 and/or summarization service platform 125 may include one or more different servers and/or multiple components. As one example, summarization service platform 125 may include multiple instances of different text summarizers configured on one or more text summarization servers. Similarly, database 123 may include one or more database servers and may not be directly connected to application platform 121 and/or summarization service platform 125. For example, database 123 and its components may be replicated and/or distributed across multiple servers and/or components. In some embodiments, components not shown in FIG. 1 may also exist.

Figure 2:
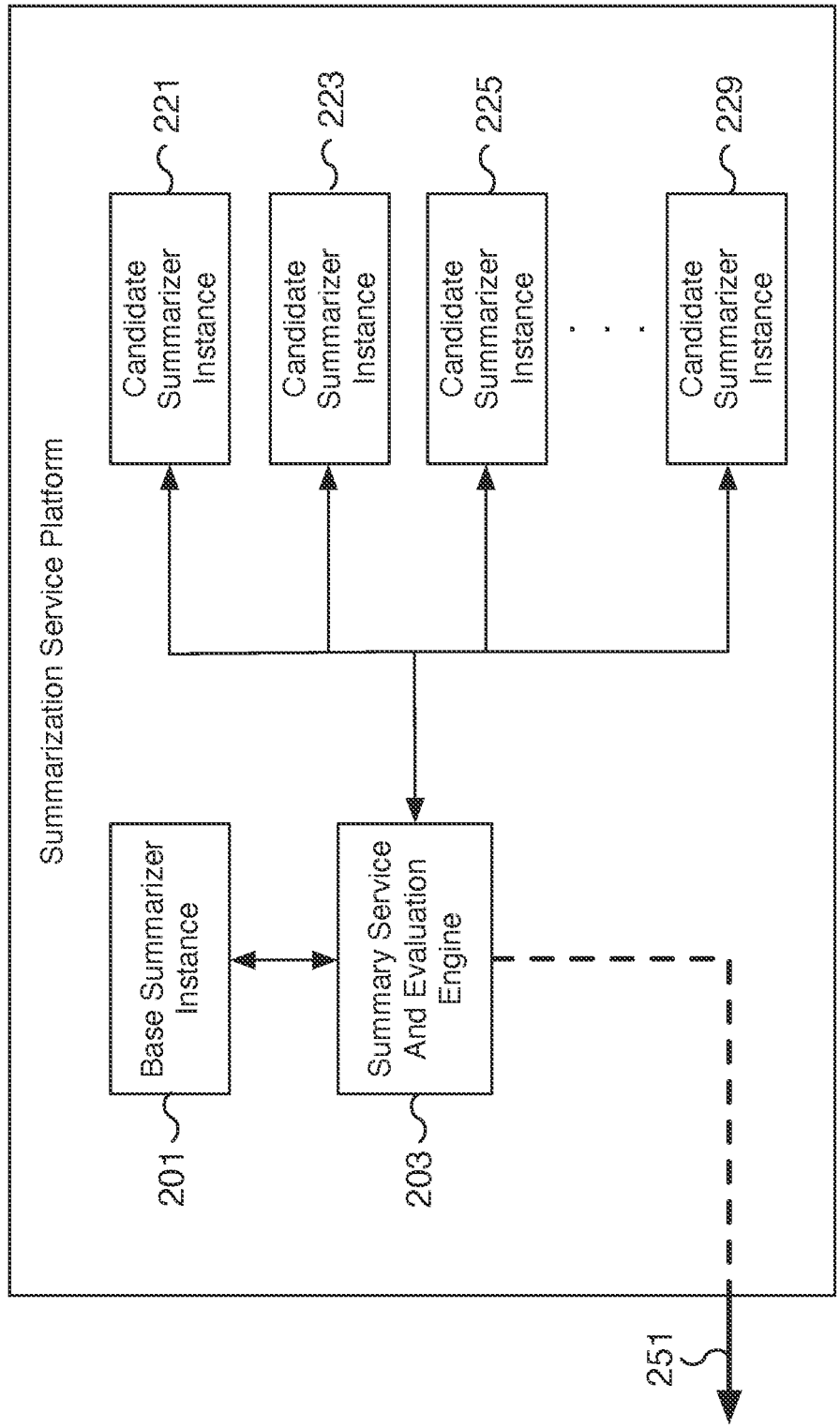
FIG. 2 is a block diagram illustrating an embodiment of a summarization service platform.

FIG. 2 is a block diagram illustrating an embodiment of a summarization service platform. Summarization service platform 200 is utilized for evaluating different candidate summarizers to select the best summarizer for generating a summary. In various embodiments, when provided with a request to summarize content, summarization service platform 200 can generate an abstractive summary utilizing the best summarizer from a group of different candidate summarizers. In the example shown, summarization service platform 200 includes base summarizer instance 201, summary service and evaluation engine 203, candidate summarizer instances 221, 223, 225, and 229, and network connection 251. When provided with content to summarize via network connection 251, summarization service platform 200 selects the best summarizer from among candidate summarizer instances 221, 223, 225, and 229 and generates a summary. In some embodiments, summarization service platform 200 is summarization service platform 125 of FIG. 1 and network connection 251 connects summarization service platform 200 to external components such as application platform 121 and database 123 of FIG. 1.

In some embodiments, summary service and evaluation engine 203 is a summary engine used to evaluate and select the best summarizer from candidate summarizer instances 221, 223, 225, and 229. Summary service and evaluation engine 203 can initiate the generation of summaries from base summarizer instance 201 and each of candidate summarizer instances 221, 223, 225, and 229. Once the summaries are generated, summary service and evaluation engine 203 can evaluate each candidate summary against the base summary. In some embodiments, the evaluation is performed by computing an evaluation metric such as a Rouge-L f-measure metric for each of the candidate summaries, one by one, against the base summary. In various embodiments, each candidate summary is only evaluated against the base summary to determine an evaluation metric for the corresponding candidate summarizer. The determined evaluation metrics can then be compared to one another, for example, by ranking the evaluation metrics. In some embodiments, the higher the evaluation metric is for a summary, the closer the candidate summary is compared to the base summary. In various embodiments, the base summary is an extractive summary and the candidate summaries are abstractive summaries.

In some embodiments, the candidate summarizer is based on evaluated metrics computed over a single document or multiple documents. For example, a corpus of documents can be evaluated by summary service and evaluation engine 203 to determine the best summarizer across the corpus. In some embodiments, the determination is made by categorizing the documents into different document types, and a different candidate summarizer can be identified as the best summarizer for a specific document type. In various embodiments, summary service and evaluation engine 203 responds to a request for content summarization by selecting the best summarizer for the document and/or document type and generating a summary. The best summarizer can be dynamically selected by evaluating each candidate summary in real time and comparing their corresponding computed evaluation metrics. In some embodiments, the best summarizer is predetermined by evaluating each candidate summarizer using one or more previous documents that resemble the provided content for which a summary is requested.

In some embodiments, summary service and evaluation engine 203 is further utilized to preprocess the content before summarization. For example, the provided content can be stripped of non-text data such as images and formatting. In some embodiments, the content is filtered by removing non-alphanumeric characters other than punctuation. In various embodiments, the pre-processing is performed to provide the text summarizers with content that is text-based.

In some embodiments, base summarizer instance 201 is an extractive summarizer that is used to generate a base summary. By utilizing an extractive summarizer for base summarizer instance 201, the generated summary from the selected candidate summarizer will be highly accurate and closely resemble the content of the base summary. When paired with candidate summarizers that are abstractive summarizers, the selected model summary is an abstractive summary that has the benefits of an abstractive summary while also retaining much of the accuracy of an extractive summary. In some embodiments, base summarizer instance 201 can be a summarizer that is not necessarily an extractive summarizer. For example, base summarizer instance 201 can be a summarizer with a particular tone and/or writing style. In some embodiments, an organization or corporation can select a particular writing style for its content. Using a base summarizer trained with the selected writing style will allow the generated summary from the selected candidate summarizer to mimic the organization's selected writing style. In various embodiments, the configuration of base summarizer instance 201 is used to configure the output style of the generated summaries from summarization service platform 200.

In some embodiments, candidate summarizer instances 221, 223, 225, and 229 are each candidate summarizers from which one can be selected as the best summarizer for a particular document or document type. Although four candidate summarizers are shown in FIG. 2, fewer or more candidate summarizers can be evaluated by summarization service platform 200. In various embodiments, candidate summarizer instances 221, 223, 225, and 229 are each an abstractive summarizer and each can be trained using a different corpus of documents. For example, different training datasets include new articles, email, medical journal articles, patent documents, marketing documents, financial documents, and knowledge-based articles, among others. In some embodiments, one or more of candidate summarizer instances 221, 223, 225, and 229 can be pre-trained by a third-party.

Figure 3:
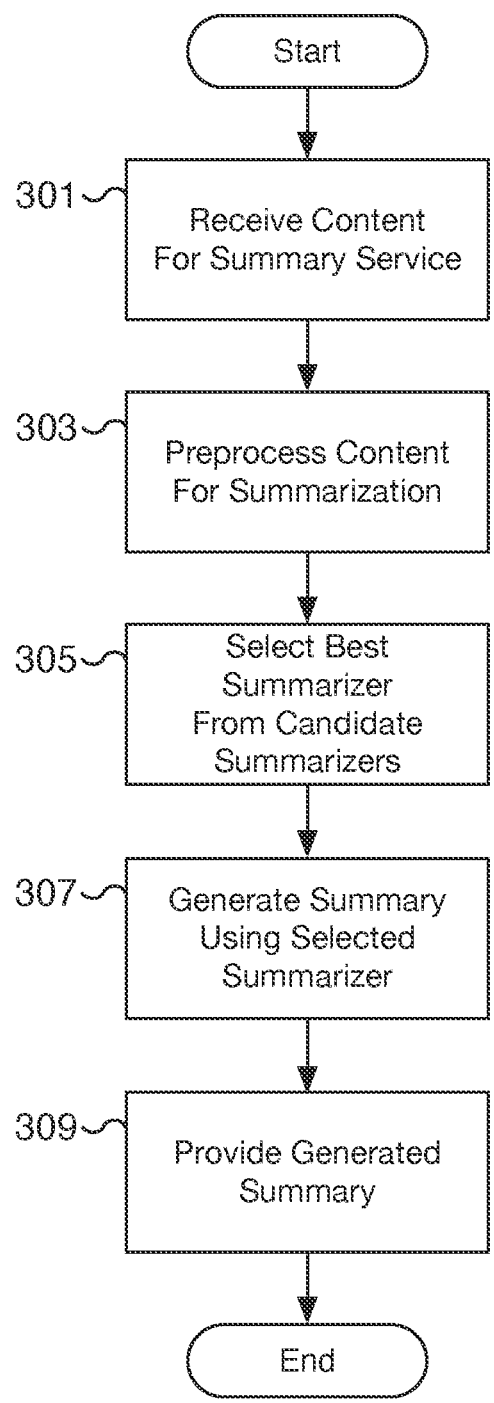
FIG. 3 is a flow chart illustrating an embodiment of a process for summarizing content utilizing a group of candidate summarizers.

FIG. 3 is a flow chart illustrating an embodiment of a process for summarizing content utilizing a group of candidate summarizers. Using the process of FIG. 3, the best candidate summarizer of a group of different candidate summarizers is selected and utilized to generate a summary for provided content. In some embodiments, the generated summary is an abstractive summary that retains much of the accuracy of an extractive summary. In some embodiments, the process of FIG. 3 is performed by summarization service platform 125 of FIG. 1 and/or summarization service platform 200 of FIG. 2. For example, access to a summary service can be hosted by an application platform such as application platform 121 of FIG. 1 which utilizes summarization service platform 200 for generating the requested summary. In some embodiments, content for summarization is provided by clients 101, 103, and/or 105 of FIG. 1 and/or by application platform 121 of FIG. 1. In some embodiments, generated summaries are hosted by application platform 121 and stored in database 123 of FIG. 1.

At 301, content for a summary service is received. For example, content is received by a summarization service platform. The received content may be forwarded by a cloud-hosted application platform offering text summarization as a service. In some embodiments, the received content can be a webpage or another document that includes formatting and other data that is not text data. Examples of content type include knowledge-based articles, news articles, research papers, marketing articles, financial documents, and email.

At 303, the content is preprocessed for summarization. For example, the content is processed to remove non-text data that is not useful for summarization. In some embodiments, images, document formatting, non-alphanumeric characters other than punctuation, and other non-essential data are removed from the content in preparation for summarizing the text portion of the content.

At 305, the best summarizer from a group of candidate summarizers is selected. For example, a model summarizer from a group of candidate summarizers, such as a group of abstractive summarizers trained using different training datasets, is selected to summarize the content received at 301. Since each candidate summarizer can be trained using a different dataset, the summaries generated from each candidate summarizer can be vastly different. For example, depending on the particular summarizer, generated abstractive summaries can be highly accurate to nearly useless and incomprehensible. In various embodiments, the best summarizer is selected by determining and comparing evaluation metrics for one or more summaries generated by each candidate summarizer. The evaluation metrics are determined by evaluating the generated candidate summaries with respect to a base summary generated by a base summarizer.

At 307, a summary is generated using the selected summarizer. For example, the best summarizer selected at 305 is used to generate a summary for the content received at 301. In various embodiments, the summary is generated using the content preprocessed at 303. In some embodiments, the summary is generated as part of the process of selecting the best summarizer at 305. However, in some embodiments, the best summarizer is preselected using documents similar to the content received at 301, and the selected best summarizer is applied to the content to generate a summary in real-time.

At 309, the generated summary is provided. For example, the summary generated at 307 is provided in response to the content received at 301. In some embodiments, the generated summary is stored in a data store for retrieval. In various embodiments, the generated summary is an abstractive summary that most closely matches a base summary.

Figure 4:
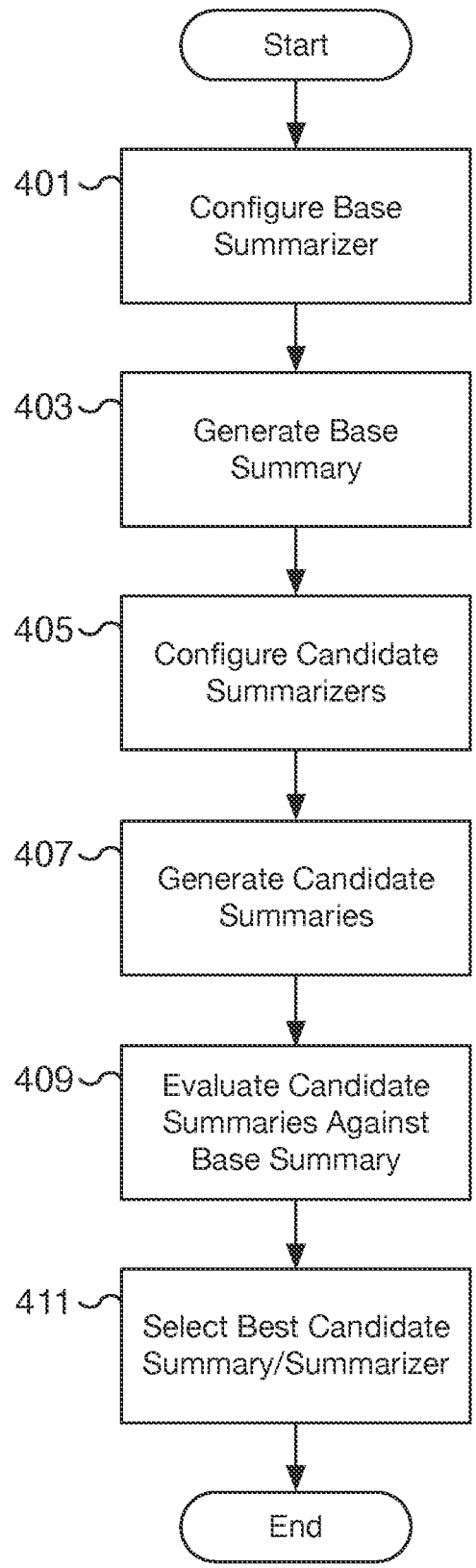
FIG. 4 is a flow chart illustrating an embodiment of a process for selecting the best summarizer from a group of candidate summarizers.

FIG. 4 is a flow chart illustrating an embodiment of a process for selecting the best summarizer from a group of candidate summarizers. Using the process of FIG. 4, the best candidate summarizer of a group of different candidate summarizers is selected by comparing the summaries generated from the candidate summarizers to a base summary generated by a base summarizer. In some embodiments, the process is performed on a single received document processed for summarization. However, the process can also be performed on a corpus of documents to select the best summarizer for a document type. For example, the process of FIG. 4 can be repeated to evaluate the performance of each candidate summarizer over each received document from a training corpus of documents. Using the overall performance across the training corpus, the best summarizer can be selected. In some embodiments, the candidate summarizers are abstractive summarizers and the base summarizer is an extractive summarizer. In some embodiments, the base summarizer is a summarizer trained in the desired style of the ideal summary, such as a summarizer trained with documents having a certain tone, writing style, and/or vocabulary, etc. In some embodiments, the process of FIG. 4 is performed by summarization service platform 125 of FIG. 1 and/or summarization service platform 200 of FIG. 2 at 305 and/or 307 of FIG. 3. In some embodiments, the configuration data for generating summaries and/or selecting summaries/summarizers including the best summarizer for summarizing a document or document type is stored in a database such as database 123 of FIG. 1.

At 401, a base summarizer is configured. For example, a base summarizer such as an extractive summarizer is configured for generating base summaries. By utilizing an extractive summarizer as the base summarizer, the selected summarizer will have a similar accuracy profile as the base extractive summarizer and the summaries generated by the selected summarizer will accurately reflect the original documents. In some embodiments, the base summarizer is configured for the desired style of the ideal summary. For example, the base summarizer can be trained with documents having a certain tone, writing style, and/or vocabulary of the desired output summary.

At 403, a base summary is generated. Using the base summarizer configured at 401, a base summary is generated. In the event the base summarizer is an extractive summarizer, the generated summary is a summary with the exact wording, phrases, and/or sentences extracted from the original document.

At 405, candidate summarizers are configured. For example, a group of different candidate summarizers are configured. Each summarizer can be unique and trained using a different training dataset. Example training datasets include news articles, financial documents, marketing documents, medical publications, research articles, emails, and patent documents, among others. In some embodiments, one or more of the candidate summarizers are trained and supplied by a third party. In various embodiments, the candidate summarizers are abstractive summarizers and can rewrite and/or synthesize key points from a document when generating a summary.

At 407, candidate summaries are generated. For example, each candidate summarizer configured at 405 generates a summary using the same received document. In some embodiments, the summaries are stored as an array of summaries. Moreover, summaries and/or portions of the summaries can be stored and/or indexed based on each paragraph of the document they summarize. For example, for a particular paragraph, the corresponding summary from each summarizer can be retrieved. In some embodiments, the generated candidate summaries can be stored along with the original document's paragraph and corresponding base summary of the paragraph. In various embodiments, the generated candidate summaries are tagged and stored for future retrieval to bypass the extensive time-consuming summary generation process.

In some instances, particularly poor and/or invalid summaries may be generated by one or more candidate summarizers. In some embodiments, a post-processing step is performed to filter invalid portions from a generated summary. For example, some summarizers may introduce padded symbols in a summary when substituting digits with a #symbol. Using a rules-based engine, these invalid portions can be stripped from the generated summary.

At 409, candidate summaries are evaluated against the base summary. Using the base summary generated at 403 as a reference, each candidate summary generated at 407 is evaluated to determine how close it is to the base summary. In various embodiments, the closest candidate summary corresponds to the best summarizer. In some embodiments, an evaluation metric is determined for each generated summary and its corresponding summarizer. For example, a Rouge-L f-measure metric can be determined for each candidate summarizer to evaluate how close the summarizer's generated summary is to the base summary. In some embodiments, the evaluation metrics for the candidate summarizers are determined using a single document or over a set of documents. For example, when computing evaluation metrics using a set of documents, the average, running average, or another technique such as a statistical or sampling technique can be used to determine an overall evaluation metric for each summarizer from multiple document evaluation metrics. In some embodiments, a running average associates different weights for each evaluation metric. For example, the more recently determined evaluation metrics can be weighted more heavily than evaluation metrics determined in the past.

At 411, the best candidate summary and/or summarizer is selected. For example, using the evaluated metrics determined at 409, the best candidate summary and/or summarizer is selected. In some embodiments, when the process of FIG. 4 is performed on a single document, the best summary is generated by the best summarizer based on evaluation metrics for the document and the corresponding summary is selected. In some embodiments, when the process of FIG. 4 is performed over a set of documents, the best summarizer is selected, and the selection of a summarizer corresponds to the best summarizer for the particular document type the training documents represent. When a request to summarize a document of the same particular document type is received, the selected summarizer can be applied to generate the best summary.

In some embodiments, evaluation metrics utilized at 409 are Rouge-L f-measure metric values. Summaries with the highest f-measure values are the best summaries and correspond to the best summarizers. In some embodiments, the candidate summarizers are ranked by their evaluation metrics, and the model summarizer/summary is selected based on the ranking.

Figure 5:
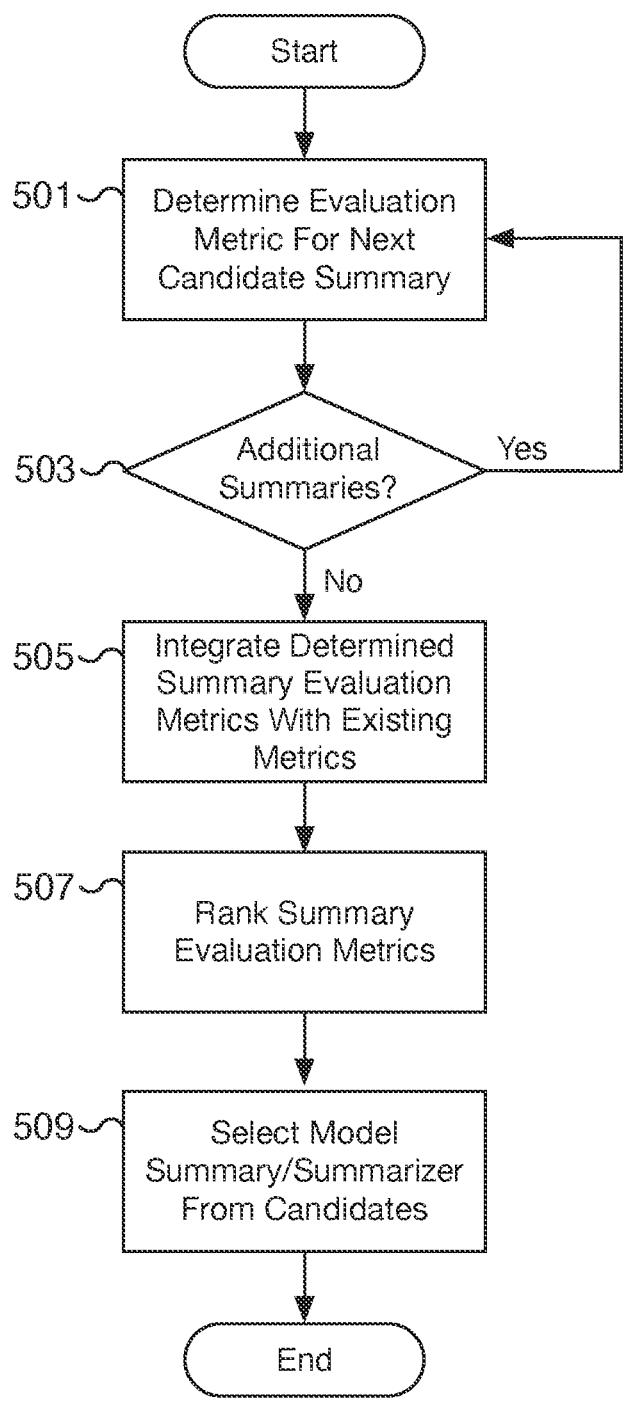
FIG. 5 is a flow chart illustrating an embodiment of a process for evaluating different candidate summarizers to select the best summarizer and/or corresponding generated summary.

FIG. 5 is a flow chart illustrating an embodiment of a process for evaluating different candidate summarizers to select the best summarizer and/or corresponding generated summary. Using the process of FIG. 5, different candidate summarizers are evaluated by comparing a candidate summary generated by each candidate summarizer to a base summary generated by a base summarizer and ranking the resulting evaluation metrics. The generated candidate summaries are each only directly compared with the base summary and not with one another. Since a summary generated by each new candidate summarizer is only evaluated directly with a base summary, as the number of candidate summarizers increases, the evaluation process grows linearly and not exponentially. And although the process of FIG. 5 can evaluate candidate summarizers using a single document, when using multiple documents such as a corpus of documents of the same type, the process can compute a running evaluation metric of the different summarizers that is updated as additional documents are summarized. In some embodiments, the process of FIG. 5 is performed by summarization service platform 125 of FIG. 1 and/or summarization service platform 200 of FIG. 2 at 305 and/or 307 of FIG. 3 and/or at 409 and/or 411 of FIG. 4. In some embodiments, the data for evaluating summaries and/or summarizers including evaluation metrics is stored in a database such as database 123 of FIG. 1.

At 501, an evaluation metric for the next candidate summary is determined. In various embodiments, candidate summaries are generated by the candidate summarizers and an evaluation metric is determined by comparing the next candidate summary to be evaluated to a base summary generated by a base summarizer. In some embodiments, the determined evaluation metric is a Rouge-L f-measure metric that is computed for the candidate summary against the base summary. The computed Rouge-L f-measure value corresponds to how near the candidate summary is compared to the base summary. In various embodiments, a high f-measure value for a candidate summary corresponds to a candidate summarizer that generates summaries that closely matches the base summarizer.

At 503, a determination is made whether additional candidate summaries exist. In the event additional candidate summaries exist, processing loops back to 501. For example, additional candidate summaries exist that have not been evaluated and the next candidate summary to be evaluated is analyzed to determine an evaluation metric at 501. In the event no additional candidate summaries exist, processing proceeds to 505.

At 505, determined summary evaluation metrics are integrated with existing metrics. For example, the summary evaluation metrics determined by the multiple passes through step 501 are integrated with any evaluation metrics from past document summarizations. By evaluating the candidate summarizers across multiple documents, a more accurate evaluation metric is determined. In some embodiments, the summary evaluation metrics determined at 501 are integrated with previously computed evaluation metrics for the candidate summarizers using other similar documents. For example, an overall evaluation metric for each summarizer is determined from multiple document evaluation metrics by calculating an average, calculating a running average, or applying another technique such as a statistical or sampling technique.

At 507, the summary evaluation metrics for the different candidate summarizers are ranked. In various embodiments, the evaluation metrics are ranked in descending order, and the candidate summarizer with the highest evaluation metric corresponds to the candidate summarizer that generates the best or most relevant summaries. In some embodiments, low ranking candidate summarizers are removed from the generated ranking. For example, candidate summarizers (and their corresponding summaries) with an evaluation metric that do not meet a minimum evaluation metric threshold are removed from the generated ranking and cannot be selected as the model summarizer and/or summary.

At 509, a model summary and/or summarizer is selected from candidate summaries and summarizers. For example, the best summary and/or summarizer is selected based on the ranking of the summary evaluation metrics. In some embodiments, the summary is selected as the best summary and returned in response to a request to summarize a corresponding document. This use case can be applied when a candidate summarizer has not already been selected for the document and/or document type for which a summary is requested. In some embodiments, the best summarizer is selected in response to a training process for identifying the best summarizer for a particular document type. By predetermining and selecting the best summarizer from the candidate summarizers, a summary can be generated on demand when requested using the predetermined summarizer with minimal processing delay. Depending on the use case, a summary, summarizer, or both may be selected at 509, and the selection may be applied for future summary requests. In various embodiments, the selected summary and/or summarizer is based on the determined evaluation metrics and the selection corresponds to the best summary results with respect to the properties of the base summarizer.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving content to be summarized;
analyzing the content using an extractive summarizer to determine a reference extractive summary of the content;
analyzing the content using a plurality of different abstractive summarizers to determine candidate abstractive summaries of the content;
automatically comparing each of the candidate abstractive summaries with the reference extractive summary to determine corresponding evaluation metrics for the candidate abstractive summaries with respect to the reference extractive summary; and
based at least in part on the evaluation metrics that indicate relative performances of the different abstractive summarizers with respect to the extractive summarizer, automatically selecting one of the candidate abstractive summaries as a selected summary to be provided.

2. The method of claim 1, further comprising:
selecting a corresponding abstractive summarizer from the plurality of different abstractive summarizers associated with the selected summary; and
configuring the selected abstractive summarizer for summarizing a second content received to be summarized.

3. The method of claim 2, wherein the content received to be summarized and the second content received to be summarized are associated with a same document type.

4. The method of claim 3, wherein the document type is a knowledge-based article, a news article, a research paper, a marketing document, a financial document, a patent document, or an email document.

5. The method of claim 1, further comprising:
ranking the determined corresponding evaluation metrics in an order; and
associating each of the determined corresponding evaluation metrics with a corresponding one of the plurality of the different abstractive summarizers.

6. The method of claim 1, wherein selecting one of the candidate abstractive summaries as the selected summary includes identifying a best determined evaluation metric of the determined corresponding evaluation metrics.

7. The method of claim 6, wherein the determined corresponding evaluation metrics include Rouge-L f-measure metrics.

8. The method of claim 1, further comprising:
averaging the determined corresponding evaluation metrics with previously determined evaluation metrics associated with the plurality of different abstractive summarizers, wherein the previously determined evaluation metrics were determined utilizing previously received content different from the received content to be summarized.

9. The method of claim 8, wherein the previously received content and the content received to be summarized are associated with a same document type.

10. The method of claim 8, wherein averaging the determined corresponding evaluation metrics with the previously determined evaluation metrics includes utilizing a running average to more heavily weight the determined corresponding evaluation metrics than the previously determined evaluation metrics.

11. A system, comprising:
one or more processors;
a network communication interface, wherein the network communication interface is connected to an intranet environment; and
a memory coupled to the one or more processors, wherein the memory is configured to provide the one or more processors with instructions which when executed cause the one or more processors to:
receive content to be summarized;
analyze the content using an extractive summarizer to determine a reference extractive summary of the content;
analyze the content using a plurality of different abstractive summarizers to determine candidate abstractive summaries of the content;
automatically compare each of the candidate abstractive summaries with the reference extractive summary to determine corresponding evaluation metrics for the candidate abstractive summaries with respect to the reference extractive summary; and
based at least in part on the evaluation metrics that indicate relative performances of the different abstractive summarizers with respect to the extractive summarizer, automatically select one of the candidate abstractive summaries as a selected summary to be provided.

12. The system of claim 11, wherein the memory is further configured to provide the one or more processors with instructions which when executed cause the one or more processors to:
select a corresponding abstractive summarizer from the plurality of different abstractive summarizers associated with the selected summary; and
configure the selected abstractive summarizer for summarizing a second content received to be summarized.

13. The system of claim 12, wherein the content received to be summarized and the second content received to be summarized are associated with a same document type.

14. The system of claim 13, wherein the document type is a knowledge-based article, a news article, a research paper, a marketing document, a financial document, a patent document, or an email document.

15. The system of claim 11, wherein the memory is further configured to provide the one or more processors with instructions which when executed cause the one or more processors to:
- rank the determined corresponding evaluation metrics in an order; and
- associate each of the determined corresponding evaluation metrics with a corresponding one of the plurality of the different abstractive summarizers.

16. The system of claim 11, wherein selecting one of the candidate abstractive summaries as the selected summary includes identifying a best determined evaluation metric of the determined corresponding evaluation metrics.

17. The system of claim 16, wherein the determined corresponding evaluation metrics include Rouge-L f-measure metrics.

18. The system of claim 11, wherein the memory is further configured to provide the one or more processors with instructions which when executed cause the one or more processors to:
- average the determined corresponding evaluation metrics with previously determined evaluation metrics associated with the plurality of different abstractive summarizers, wherein the previously determined evaluation metrics were determined utilizing previously received content different from the received content to be summarized.

19. The system of claim 18, wherein the previously received content and the content received to be summarized are associated with a same document type.

20. A computer program product, the computer program product being embodied in a non-transitory computer readable storage medium and comprising computer instructions for:
- receiving content to be summarized;
- analyzing the content using an extractive summarizer to determine a reference extractive summary of the content;
- analyzing the content using a plurality of different abstractive summarizers to determine candidate abstractive summaries of the content;
- automatically comparing each of the candidate abstractive summaries with the reference extractive summary to determine corresponding evaluation metrics for the candidate abstractive summaries with respect to the reference extractive summary; and
- based at least in part on the evaluation metrics that indicate relative performances of the different abstractive summarizers with respect to the extractive summarizer, automatically selecting one of the candidate abstractive summaries as a selected summary to be provided.

* * * * *